US008339311B2

(12) United States Patent
Walley et al.

(10) Patent No.: US 8,339,311 B2
(45) Date of Patent: Dec. 25, 2012

(54) METHOD AND SYSTEM FOR A FULL GNSS CAPABLE MULTI-STANDARD SINGLE CHIP

(75) Inventors: John Walley, Ladera Ranch, CA (US); Charles Abraham, Los Gatos, CA (US); Evan McCarthy, Costa Mesa, CA (US); Kambiz Shoarinejad, Tustin, CA (US)

(73) Assignee: Broadcom Corporation, Irvine, CA (US)

( * ) Notice: Subject to any disclaimer, the term of this patent is extended or adjusted under 35 U.S.C. 154(b) by 295 days.

(21) Appl. No.: 12/509,418

(22) Filed: Jul. 24, 2009

(65) Prior Publication Data
US 2011/0018761 A1 Jan. 27, 2011

(51) Int. Cl.
*G01S 19/45* (2010.01)
(52) U.S. Cl. .................................................. 342/357.28
(58) Field of Classification Search ............. 342/357.28, 342/357.29, 357.39, 357.46; 701/213, 468, 701/470
See application file for complete search history.

(56) References Cited

U.S. PATENT DOCUMENTS

| | | | |
|---|---|---|---|
| 6,087,983 A | 7/2000 | Ho et al. | |
| 7,970,412 B2 * | 6/2011 | Pande et al. ................ | 455/456.1 |
| 2006/0049982 A1* | 3/2006 | Wells ........................ | 342/357.1 |
| 2007/0182625 A1 | 8/2007 | Kerai et al. | |
| 2009/0061898 A1 | 3/2009 | Johnson et al. | |
| 2010/0176988 A1* | 7/2010 | Maezawa et al. ........ | 342/357.05 |
| 2011/0175773 A1* | 7/2011 | Syrjarinne et al. ....... | 342/357.25 |

OTHER PUBLICATIONS

Broadcom Corporation: "BCM2075—Multifunction Monolithic IC with AGPS, Bluetooth 2.1+EDR, and Integrated FM Transceiver" [Online] Dec. 23, 2008, XP002614496 Irvine, CA, USA Product Brief Retrieved from the Internet: URL:http://www.datasheetdir.com/BCM2075+download> [retrieved on Dec. 13, 2010].
GPS World: "Broadcom Combos GPS, Bluetooth, and FM Radio System-on-Chip" [Online] Feb. 9, 2009, XP002614497 Consumer OEM News Retrieved from the Internet: URL:http://www.gpsworld.com/consumer-oem/news/broadcom-combos-gps-bluetooth-and-fm-radio-system-chip-6969> [retrieved on Dec. 13, 2010].
CSR Press Releases: "CSR Unveils CSR9000—the World's Most Integrated Bluetooth, Wi-Fi, GPS and FM Solution for Mobile Devices" [Online] Feb. 16, 2009, XP002614498 Retrieved from the Internet:URL:http://www.csr.com/news/pr/release/46/en [retrieved on Dec. 15, 2010].
Charles Abraham and Frank Van Diggelen: Host-Based GPS—an Emerging Architecture for High Volume Consumer Applications: Proc. of ION GNSS 2007, Sep. 25, 2007, pp. 2279-2284, XP002614499 Fort Worth, TX, USA.
EPO Communication dated Feb. 1, 2011 in Application No. 10007585.2-2220.

* cited by examiner

*Primary Examiner* — Dao Phan
(74) *Attorney, Agent, or Firm* — Sterne, Kessler, Goldstein & Fox P.L.L.C.

(57) ABSTRACT

A multi-standard single chip integrated within a multi-standard mobile device concurrently receives multi-standard radio frequency signals by corresponding two or more integrated radios. The multi-standard single chip generates full GNSS measurement comprising pseudo-range information using the received radio frequency signals. The multi-standard single chip comprises a GNSS radio and multiple non-GNSS radios such as Bluetooth. The full GNSS measurement is generated using GNSS radio frequency signals received by the integrated GNSS radio and communicated over, for example, Bluetooth radio. GNSS satellite reference information embedded in radio frequency signals received by the integrated non-GNSS radios is extracted to assist the full GNSS measurement. A full GNSS navigation solution for the multi-standard mobile device is generated internally to and/or externally to the multi-standard single chip depending on the location of a navigation engine. The generation of the full GNSS measurement is independent of a host processor within the multi-standard mobile device.

20 Claims, 5 Drawing Sheets

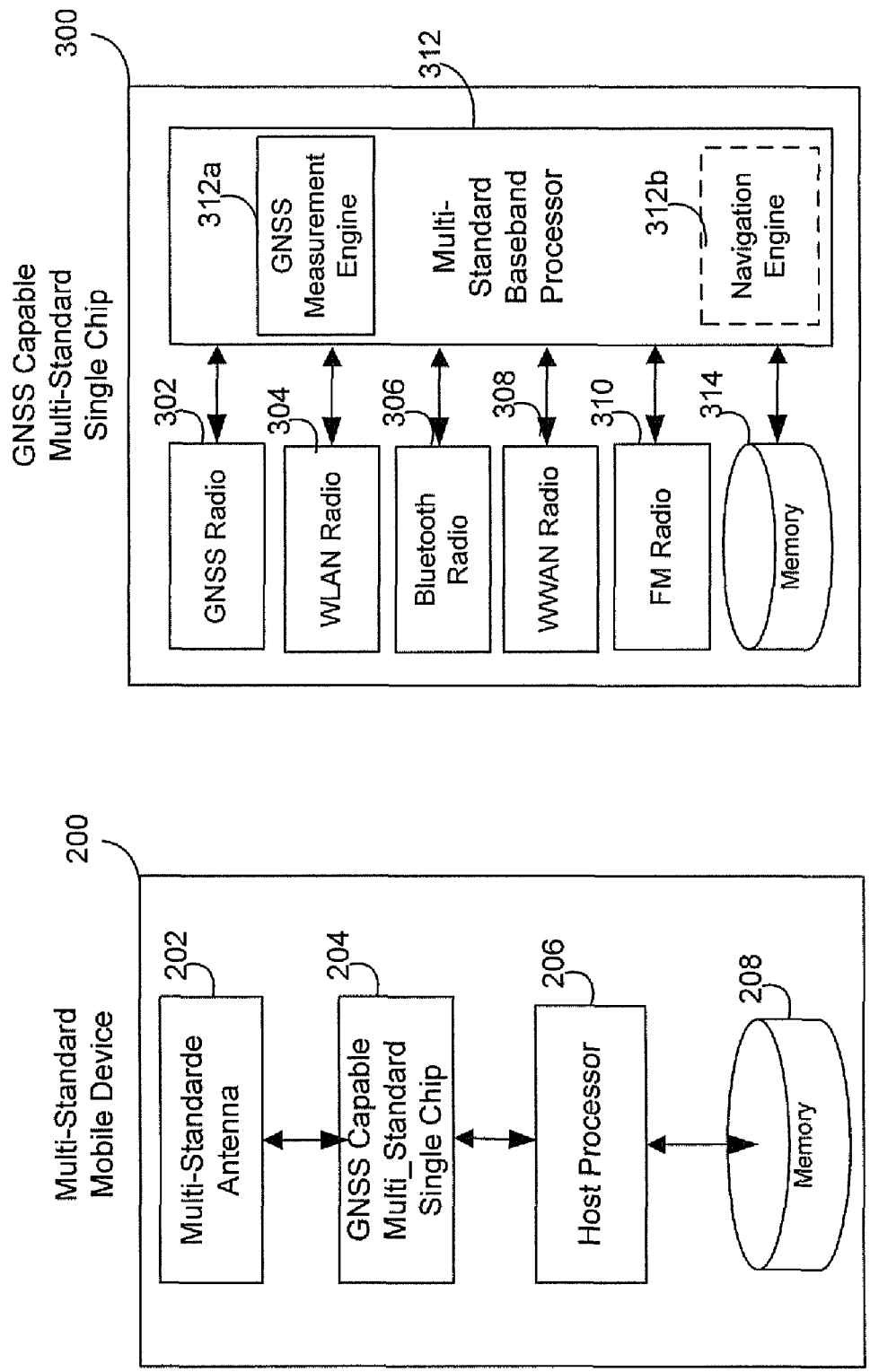

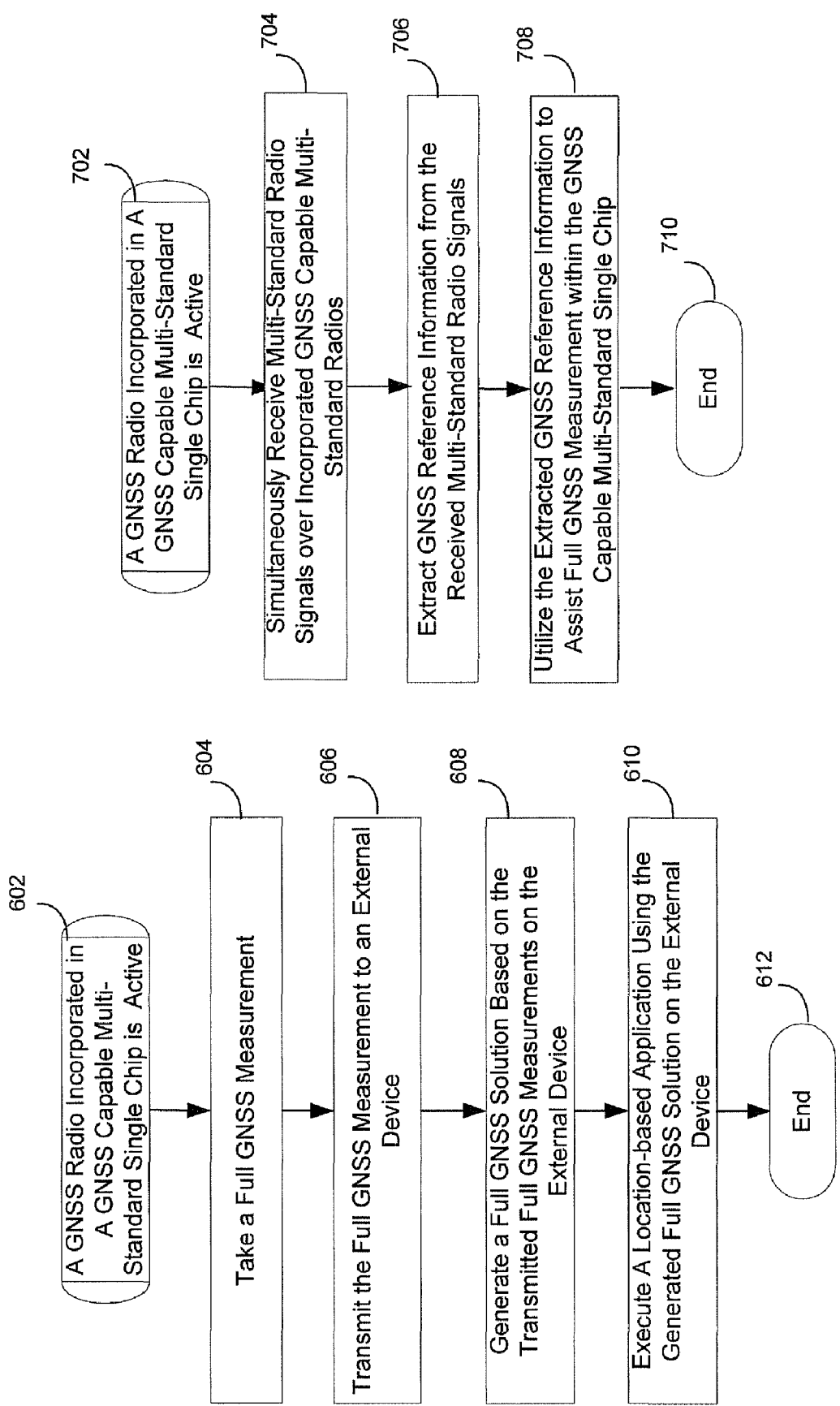

METHOD AND SYSTEM FOR A FULL GNSS CAPABLE MULTI-STANDARD SINGLE CHIP

CROSS-REFERENCE TO RELATED APPLICATIONS/INCORPORATION BY REFERENCE

NOT APPLICABLE.

FIELD OF THE INVENTION

Certain embodiments of the invention relate to communication systems. More specifically, certain embodiments of the invention relate to a method and system for a full GNSS capable multi-standard single chip.

BACKGROUND OF THE INVENTION

Location based services (LBS) are emerging as a new type of value-added service provided by mobile communication network. LBS are mobile services in which the location information of mobile devices is used in order to enable various LBS applications such as, for example, enhanced 911 (E-911), location-based 411, location-based messaging and/or friend finding. A position of a mobile device is determined using, for example, satellite-based systems such as Global Navigation Satellite Systems (GNSS) such as, for example, the Global Positioning System (GPS), the Global Orbiting Navigation Satellite System (GLONASS), and the satellite navigation system GALILEO. A GNSS utilizes an earth-orbiting constellation of a plurality of GNSS satellites each broadcasting GNSS signals that indicate its precise location and ranging information.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a full GNSS capable multi-standard single chip, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 is a block diagram illustrating an exemplary multi-standard mobile device that is operable to support multiple communication technology standards via an integrated GNSS capable multi-standard single chip, in accordance with an embodiment of the invention.

FIG. 3 is a block diagram illustrating an exemplary GNSS capable multi-standard single chip that is operable to concurrently communicate over multi-standard radios, in accordance with an embodiment of the invention.

FIG. 6 a flow chart illustrating an exemplary procedure that is utilized to externally generate a full GNSS navigation solution on a remote device using full GNSS measurements from a GNSS capable multi-standard single chip, in accordance with an embodiment of the invention.

FIG. 7 a flow chart illustrating an exemplary procedure in which a GNSS capable multi-standard single chip is operable to utilize radio frequency signals received via integrated multi-standard radios to assist on-chip full GNSS measurement, in accordance with an embodiment of the invention.

DETAILED DESCRIPTION OF THE INVENTION

Certain embodiments of the invention may be found in a method and system for a full GNSS capable multi-standard single chip. In various embodiments of the invention, a GNSS capable multi-standard single chip integrated within a multi-standard mobile device is operable to concurrently receive and/or transmit multi-standard radio frequency (RF) signals by corresponding two or more radios integrated within the GNSS capable multi-standard single chip. The GNSS capable multi-standard single chip may be operable to generate full GNSS measurement from the received radio frequency signals. The generated full GNSS measurement may comprise pseudo-range information. The GNSS capable multi-standard single chip may comprise an integrated GNSS radio and a plurality of integrated non-GNSS radios such as, for example, a WLAN radio, a Bluetooth, a WWAN radio, and/or a FM radio. The FM radio may possess FM receive and/or FM transmit capability. The WWAN radio comprises WiMAX radio and one or more cellular radios such as, for example, GSM radio, GPRS radio, UMTS radio, EDGE radio, EGPRS radio, and/or LTE radio.

The GNSS capable multi-standard single chip may be operable to generate the full GNSS measurement for GNSS radio frequency signals received by the integrated GNSS radio. GNSS satellite reference information embedded inside radio frequency signals received by the integrated radios, for example, the WLAN radio, the Bluetooth radio, the WWAN radio, and/or the FM radio may be extracted to be used as GNSS reference data to assist full GNSS measurement. The extracted GNSS satellite reference information may comprise, for example, an International Mobile Subscriber Identity (IMSI), a Mobile Network Code (MNC), a Mobile Country Code (MCC), a Location Area Code (LAC), Cell ID, a Radio Network Controller (RNC) ID, a base station ID, a broadcast tower ID, and/or time information. Depending on the location of a navigation engine, a full GNSS navigation solution for the multi-standard mobile device may be generated internally to and/or externally to the GNSS capable multi-standard single chip. In instances where the navigation engine may be located on a remote device, the multi-standard mobile device may be operable to communicate the full GNSS measurement with the remote device using a corresponding integrated radio such as the Bluetooth radio for the full GNSS navigation solution. The multi-standard single chip may be operable to generate the full GNSS measurement independent of a host processor within the multi-standard mobile device. The generation of the full GNSS measurement is solely within the integrated GNSS capable multi-standard single chip without intervention or input from a host processor within the multi-standard mobile device.

Figure 1:
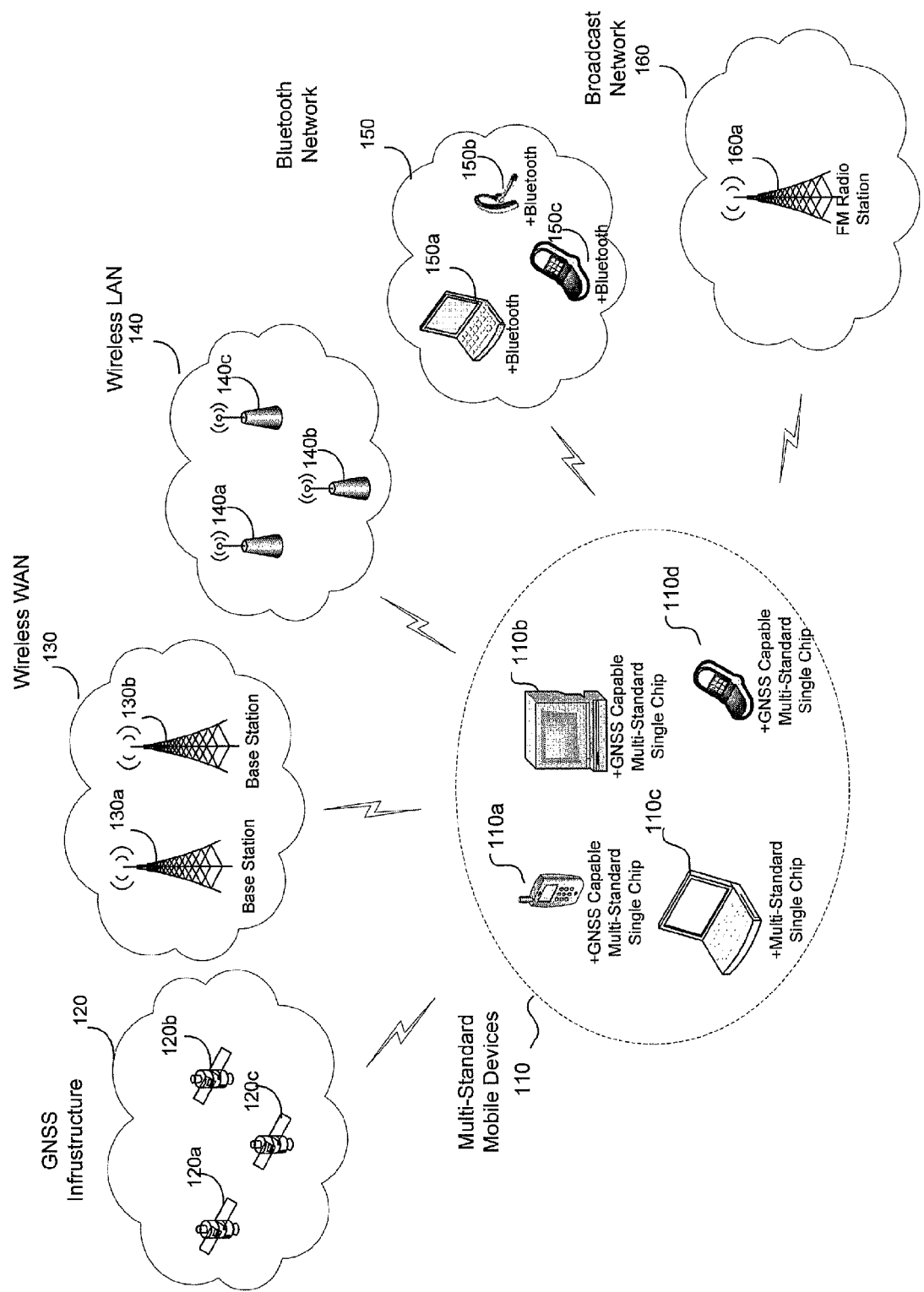
FIG. 1 is a diagram illustrating an exemplary communication system that is operable to support communications over mobile devices that are integrated with multi-standard radios, in accordance with an embodiment of the invention.

FIG. 1 is a diagram illustrating an exemplary communication system that is operable to support communications over mobile devices that are integrated with multi-standard radios, in accordance with an embodiment of the invention. Referring to FIG. 1, there is shown a communication system 100. The communication system comprises a plurality of multi-standard mobile devices 110, of which multi-standard mobile devices 110a-110d are illustrated, a GNSS infrastructure 120, a wireless wide area network (WAN) 130, a wireless local area network (LAN) 140, a Bluetooth network 150, and a broadcast network 160. The GNSS infrastructure 120 comprises a plurality of GNSS satellites, of which GNSS satellites 120a through 120c are presented. The wireless WAN 130 comprise a plurality of base stations, of which base stations 130a and 130b are illustrated. The wireless LAN 140 comprises a plurality of WLAN access points, of which access points 140a through 140c are displayed. The Bluetooth network 150 comprises a plurality of Bluetooth enabled mobile devices such as Bluetooth enabled mobile devices 150a through 150c. The broadcast network 160 comprises broadcast towers such as a FM radio station 160a.

A multi-standard mobile device such as the multi-standard mobile device 110a may comprise suitable logic, circuitry, interfaces and/or code that are operable to concurrently communicate radio frequency signals using a plurality of radio communication technologies. The plurality of radio communication technologies may be integrated within a GNSS capable multi-standard single chip integrated inside the multi-standard mobile device 110a. Using the integrated GNSS capable multi-standard single chip, the multi-standard mobile device 110a may be operable to concurrently communicate radio frequency signals across, for example, the wireless WAN 140, the wireless LAN 130, the Bluetooth network 150, the GNSS infrastructure 120 and/or the broadcast network 160. The multi-standard mobile device 110a may be operable to take full GNSS measurements from GNSS radio frequency signals received from visible GNSS satellites such as the GNSS satellites 120a-120c. The full GNSS measurement may comprise pseudo-range, carrier phase, and/or Doppler, which may be calculated using the received GNSS signals from visible GNSS satellites of the full GNSS satellite constellation such as, for example, 28 GPS satellites for GPS. The full GNSS measurements may be calculated inside the integrated GNSS capable multi-standard single chip.

The multi-standard mobile device 110a may comprise correlators within the integrated GNSS capable multi-standard single chip to search and/or detect GNSS radio frequency signals from the visible GNSS satellites such as the GNSS satellites 120a-120c. Specific time and/or location related information embedded in radio frequency signals received from, for example, the wireless WAN 140, the wireless LAN 130, and/or the Bluetooth network 150, and/or the broadcast network 160, may be extracted. The extracted specific time and/or location related information may be used as GNSS reference information or GNSS assistance data. The multi-standard mobile device 110a may be operable to provide or input the extracted GNSS reference information into the integrated GNSS capable multi-standard single chip to assist the full GNSS measurement.

The full GNSS measurement may be processed via a navigation process to calculate a full navigation solution. The full navigation solution may comprise GNSS time tagged navigation information such as, for example, a position, orientation, attitude, velocity, and/or clock information of the multi-standard mobile device 110a. The navigation process may be performed internal to and/or external to the integrated GNSS capable multi-standard single chip depending on where a corresponding navigation engine would be. In instances where the navigation engine may be on a remote device such as a Bluetooth enabled mobile device 150a, the multi-standard mobile device 110a may be operable to communicate the full GNSS measurements with the Bluetooth enabled mobile device 150a for the full GNSS navigation solution. The full GNSS navigation solution may be applied to various navigation services such as, for example, traffic alerts on the multi-standard mobile device 110a. The multi-standard mobile device 110a may be operable to concurrently transmit and receive FM radio frequency signals over an integrated FM radio to support multiple location-based services such as, for example, traffic alerts and turn-by-turn navigation, at the same time.

A GNSS satellite such as the GNSS satellite 120a may comprise suitable logic, circuitry, interfaces and/or code that is operable to provide satellite navigational information to various GNSS receivers on earth. The GNSS receivers, which comprise GPS, GALILEO and/or GLONASS receivers, may be integrated internally to or externally coupled to GNSS capable mobile devices such as the multi-standard mobile devices 110a through 110d. The GNSS satellite 120a may be operable to broadcast its own ephemeris periodically, for example, once every 30 seconds. The broadcast ephemeris may be utilized by the GNSS capable multi-standard single chip to calculate navigation information such as, for example, a position, velocity, and/or clock information of the GNSS receivers. In this regard, the GNSS capable multi-standard single chip is utilized to calculate navigation information such as, for example, a position, velocity, and/or clock information of the GNSS receivers without intervention from a host processor in corresponding multi-standard mobile devices.

The wireless WAN 130 may comprise suitable logic, devices, interfaces and/or code that may be operable to provide data services to various mobile devices such as the multi-standard mobile devices 110a-110d by using cellular communication technologies and/or Worldwide Interoperability for Microwave Access (WiMAX) technology. The cellular communication technologies may comprise, for example, Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). The wireless WAN 130 may be operable to communicate radio frequency signals comprising specific physical location information such as an International Mobile Subscriber Identity (IMSI), a Mobile Network Code (MNC), a Mobile Country Code (MCC), a Location Area Code (LAC), Cell ID, a Radio Network Controller (RNC) ID, and/or a base station ID. The specific physical location information embedded in the received radio frequency signals may provide information, for example, service providers and/or service serving areas. The embedded specific physical location information may be utilized by, for example, the multi-standard mobile device 110a as GNSS reference information or GNSS assistance data to assist full GNSS measurement within a corresponding integrated GNSS capable multi-standard single chip.

The wireless LAN 140 may comprise suitable logic, devices, interfaces and/or code that may be operable to provide data services to various mobile devices such as the multi-standard mobile devices 110a-110d by using wireless LAN technology. Exemplary wireless LAN technology may comprise, for example, IEEE Std 802.11, 802.11a, 802.11b, 802.11d, 802.11e, 802.11n, 802.11v, and/or 802.11u. The wireless LAN 140 may be operable to communicate radio frequency signals with associated mobile devices such as the multi-standard mobile device 110a via wireless LAN access points such as the access point 140a. The access point 140a may be operable to transmit a continuous or periodic radio frequency signal such as a beacon signal to the multi-standard mobile device 110a. The transmitted radio frequency signals may comprise specific time and/or location related information such as, for example, access point ID and/or physical location information. The specific time and/or location related information may be utilized by the multi-standard mobile device 110a as GNSS reference information or GNSS assistance data to assist full GNSS measurement within a corresponding integrated GNSS capable multi-standard single chip.

The Bluetooth network 150 may comprise suitable logic, circuitry, interfaces and/or code that may be operable to provide data services to various Bluetooth enabled mobile devices such as the Bluetooth enabled mobile devices 150a-150c and/or the multi-standard mobile devices 110 using Bluetooth technology. A Bluetooth enabled mobile device such as the Bluetooth enabled mobile device 150a may be operable to communicate Bluetooth radio frequency signals with peer Bluetooth devices such as, for example, the multi-standard mobile device 110a for various data services such as a location-based service. In this regard, the Bluetooth enabled mobile device 150a may be operable to transmit GNSS assistance data to the multi-standard mobile device 110a to assist full GNSS measurement within a corresponding integrated GNSS capable multi-standard single chip. A full GNSS navigation solution of the multi-standard mobile device 110a may be generated or calculated using the full GNSS measurement. Depending on where a corresponding navigation engine would be, the full GNSS navigation solution of the multi-standard mobile device 110a may be generated internal to and/or external to the integrated GNSS capable multi-standard single chip. In instances where the navigation engine may be located on the Bluetooth enabled mobile device 150a, the multi-standard mobile device 110a may be operable to communicate the full GNSS measurement with the Bluetooth enabled mobile device 150a by a Bluetooth radio within the integrated GNSS capable multi-standard single chip. The full GNSS navigation solution of the multi-standard mobile device 110a may be generated remotely via the navigation engine on the Bluetooth enabled mobile device 150a.

The broadcast network 160 may comprise suitable logic, circuitry and/or code that may be operable to allocate a single carrier frequency to broadcast a small subcarrier signal via a broadcast tower such as the FM radio station 160a. The FM radio station 160a may be operable to apply a FM modulation centered at the single carrier frequency. The FM radio station 160 may be operable to communicate FM radio frequency signals comprising FM audio and/or FM data to FM-capable mobile devices such as the multi-standard mobile device 110a. The FM radio frequency signals may comprise GNSS assistance data acquired from, for example, an assistance GNSS server. The FM radio frequency signals may comprise specific time and/or location related information such as, a FM station ID and/or a FM channel ID. The specific time and/or location information and/or the acquired GNSS assistance data may be utilized by the multi-standard mobile device 110a to assist full GNSS measurement within a corresponding integrated GNSS capable multi-standard single chip. The FM radio frequency signals may be broadcasted using various formats such as standard RDS audio file data formats.

Although the FM radio station 160a is illustrated in the broadcast network 160 in FIG. 1, the invention may not be so limited. Accordingly, other broadcast technologies comprising, for example, DAB, DVB-H, DVB-SH and/or DVB-T may be utilized for broadcasting radio frequency signals to the multi-standard mobile device 110a without departing from the spirit and scope of various embodiments of the invention.

In an exemplary operation, a multi-standard mobile device such as the multi-standard mobile device 110a may be operable to concurrently communicate a plurality multi-standard radios signals using an integrated GNSS capable multi-standard single chip. The integrated GNSS capable multi-standard single chip may be integrated with multi-standard radios such as FM radio, wireless LAN radio, wireless LAN radio, and/or Bluetooth radio. The multi-standard mobile device 110a may be operable to take full GNSS measurement inside the integrated GNSS capable multi-standard single chip. The multi-standard mobile device 110a may be operable to extract GNSS reference information from radio frequency signals received by one or more integrated multi-standard radios such as FM radio, wireless LAN radio, wireless LAN radio, and/or Bluetooth radio. The extracted GNSS reference information may be provided or input to the integrated GNSS capable multi-standard single chip as GNSS assistance data to assist full GNSS measurement.

A full navigation solution for the multi-standard mobile device 110a may be calculated or generated locally internally to the GNSS capable multi-standard single chip or remotely, for example, on a remote device, depending on where a navigation engine would be. The generated full GNSS navigation solution may be utilized by the multi-standard mobile device 110a for various location-based services, for example, traffic alerts. The multi-standard mobile device 110a may be operable to concurrently transmit and receive FM radio frequency signals over an integrated FM radio within the integrated GNSS capable multi-standard single chip to support multiple location-based services such as, for example, traffic alerts and turn-by-turn navigation, at the same time.

FIG. 2 is a block diagram illustrating an exemplary multi-standard mobile device that is operable to support multiple communication technology standards via an integrated GNSS capable multi-standard single chip, in accordance with an embodiment of the invention. Referring to FIG. 2, there is shown a multi-standard mobile device 200. The multi-standard mobile device 200 may comprise a multi-standard antenna 202, a GNSS capable multi-standard single chip 204, a host processor 206 and a memory 208.

The multi-standard antenna 202 may comprise suitable logic, circuitry, interfaces and/or code that may be operable to concurrently support multi-standard communications between external devices and the multi-standard mobile device 200. The multi-standard antenna 202 may be operable to detect and track radio frequency signals from, for example, visible GNSS satellites such as the GNSS satellites 120a through 120c in the GNSS infrastructure 120. The multi-standard antenna 202 may be operable to concurrently communicate radio frequency signals with, for example, the base station 130a in the wireless WAN 130, the access point 140a in the wireless LAN 140, the Bluetooth enabled mobile device 150a in the Bluetooth network 150, and/or the FM radio station 160*a* in the broadcast network 160. While the multi-standard antenna 202 is illustrated as a single antenna in FIG. 2, it need not be so limited. Accordingly, the multi-standard antenna 202 may comprise a plurality of separate antennas to support technology specific communications such as, for example, wireless WAN communication, wireless LAN communication, Bluetooth communication, FM communication, and/or GNSS communication, respectively. Various adaptive and/or smart antenna technologies comprising, for example, beamforming, diversity and/or MIMO (and variants thereof) may also be utilized.

The GNSS capable multi-standard single chip 204 may comprise suitable logic, circuitry, interfaces and/or code that may be operable to incorporate multi-standard radios such as, for example, GNSS radio, wireless LAN radio, wireless LAN radio, Bluetooth radio and/or FM radio. The GNSS capable multi-standard single chip 204 may comprise each of necessary correlators to search and/or acquire GNSS radio frequency signals from visible GNSS satellites such as the GNSS satellites 120*a* through 120*c*. The GNSS capable multi-standard single chip 204 may be operable to take full GNSS measurement from the acquired GNSS radio frequency signals. The GNSS capable multi-standard single chip 204 may be operable to extract GNSS reference information such as, time and/or location related information from multi-standard radio frequency signals received the integrated FM radio, wireless WAN radio, wireless LAN radio, and/or Bluetooth radio. The extracted GNSS reference information may be utilized to assist full GNSS measurement within the GNSS capable multi-standard single chip 204.

Depending on a location of the navigation engine, the GNSS capable multi-standard single chip 204 may be operable to generate a full GNSS navigation solution such as a position fix, velocity, and time of the multi-standard mobile device 200 internally to and/or externally to the GNSS capable multi-standard single chip 204. In instances where the navigation engine may be located externally to the GNSS capable multi-standard single chip 204, for example, on a remote device, the GNSS capable multi-standard single chip 204 may be operable to communicate the full GNSS measurement with the remote device by an integrayed multi-standard radios such as Bluetooth radio. Accordingly, the full GNSS navigation solution of the multi-standard mobile device 200 may be generated external to the GNSS capable multi-standard single chip 204. The generated full GNSS navigation solution may enable various location-based services, for example, roadside assistance on the multi-standard mobile device 200. The GNSS capable multi-standard single chip 204 may be operable to concurrently transmit and receive FM radio frequency signals over incorporate FM radio to support multiple location-based services such as, for example, traffic alerts and turn-by-turn navigation, at the same time.

The host processor 206 may comprise suitable logic, circuitry, interfaces and/or code that may be operable to process signals communicated with the GNSS capable multi-standard single chip 204. The host processor 206 may be operable to manage operations of the GNSS capable multi-standard single chip 204 depending on corresponding usages. For example, the host processor 206 may be operable to signal the GNSS capable multi-standard single chip 204 to activate or deactivate one or more of the integrated multi-standard radios such as GNSS radio and/or FM radio as a needed basis to save power. The host processor 206 may be operable to run various applications such as a location-based service based on a full GNSS navigation solution of the multi-standard mobile device 200. Depending on where a navigation engine would be, the full GNSS navigation solution may be generated or calculated internally to and/or externally to the GNSS capable multi-standard single chip 204. In instances where the navigation engine may be located external to the GNSS capable multi-standard single chip 204, for example, on a remote device, the host processor 206 may be operable to communicate the full GNSS measurement provided by the GNSS capable multi-standard single chip 204 to the remote device for the full GNSS navigation.

The memory 208 may comprise suitable logic, circuitry, and/or code that may be operable to store information such as executable instructions and data that may be utilized by the host processor 206. The memory 208 may comprise RAM, ROM, low latency nonvolatile memory such as flash memory and/or other suitable electronic data storage.

In an exemplary operation, the GNSS capable multi-standard single chip 204 may comprise a plurality of multi-standard radios such as, for example, GNSS radio, wireless LAN radio, wireless LAN radio, Bluetooth radio and/or FM radio. The GNSS capable multi-standard single chip 204 may be operable to generate and provide full GNSS measurement for a full GNSS navigation solution of the multi-standard mobile device 200. The full GNSS navigation solution may be calculated internal to and/or external to the GNSS capable multi-standard single chip 204 depending on where a navigation engine would be. In instances where the navigation engine may be located on a remote device, the host processor 206 may be operable to communicate the full GNSS measurement with the remote device using integrated radios, for example, Bluetooth radio. The full GNSS navigation solution of the multi-standard mobile device 200 may be calculated using the full GNSS measurement on the remote device. The GNSS capable multi-standard single chip 204 may be operable to concurrently transmit and receive FM radio frequency signals by an integrated FM radio to support multiple services such as, for example, traffic alerts and turn-by-turn navigation, at the same time.

FIG. 3 is a block diagram illustrating an exemplary GNSS capable multi-standard single chip that is operable to concurrently communicate over multi-standard radios, in accordance with an embodiment of the invention. Referring to FIG. 3, there is shown a GNSS capable multi-standard single chip 300. The GNSS capable multi-standard single chip 300 may comprise a GNSS radio 302, a wireless LAN radio (WLAN) 304, a Bluetooth radio 306, a wireless WAN radio (WWAN) 308, a FM radio 310, a multi-standard baseband processor 312, and a memory 314. The multi-standard baseband processor 312 comprises a GNSS measurement engine 312*a* and/or an optional navigation engine 312*b*.

The GNSS radio 302 may comprise suitable logic circuitry, interfaces and/or code that may be operable to detect and track GNSS radio frequency signals that are received from visible GNSS satellites such as the GNSS satellites 120*a*-120*c*. The GNSS radio 302 may comprise each of necessary correlators to acquire and receive GNSS radio frequency signals for full GNSS measurement. The GNSS radio 302 may be operable to convert the received GNSS radio frequency signals to GNSS baseband signals, which may be suitable for further processing by the multi-standard baseband processor 312.

The WLAN radio 304 may comprise suitable logic circuitry, interfaces and/or code that may be operable to transmit and receive wireless LAN radio frequency signals. The wireless LAN radio frequency signals may be communicated in a format compatible with various wireless LAN standards such as, for example, IEEE Std 802.11, 802.11a, 802.11b, 802.11d, 802.11e, 802.11n, 802.11v, and/or 802.11u. The WLAN radio 304 may be operable to receive continuous, aperiodic, or periodic wireless LAN radio frequency signals from, for example, the access point 140a in the wireless LAN 140. The received continuous or periodic WLAN radio frequency signals may comprise GNSS reference related information such as, for example, access point ID and/or access point physical location information, which may be used to assist full GNSS measurement inside the GNSS capable multi-standard single chip 300. The WLAN radio 304 may be operable to convert the received WLAN radio frequency signals to WLAN baseband signals, which may be suitable for further processing by the multi-standard baseband processor 312. The WLAN radio 304 may be operable to convert WLAN baseband signals to WLAN radio frequency signals for transmission to a remote WLAN device.

The Bluetooth radio 306 may comprise suitable logic circuitry, interfaces and/or code that may be operable to transmit and receive Bluetooth radio frequency signals. The Bluetooth radio 306 may be operable to receive Bluetooth radio frequency signals from a peer Bluetooth device, for example, the Bluetooth enabled mobile device 150b in the Bluetooth network 150. The received Bluetooth radio frequency signals may comprise GNSS reference related information such as, for example, Bluetooth clock and/or Bluetooth device address, which may be used as GNSS assistance data to assist full GNSS measurement inside the GNSS capable multi-standard single chip 300. The Bluetooth radio 306 may be operable to convert the received Bluetooth radio frequency signals to Bluetooth baseband signals, which may be suitable for further processing in the multi-standard baseband processor 312. The Bluetooth radio 306 may be operable to convert Bluetooth baseband signals to Bluetooth radio frequency signals to transmit to a remote Bluetooth device.

The WWAN radio 308 may comprise suitable logic, devices, interfaces and/or code that may be operable to transmit and receive wireless WAN radio frequency signals such as cellular radio frequency signals and/or WiMAX radio frequency signals. The WWAN radio 308 may be operable to receive wireless WAN radio frequency signals from, for example, the base station 130a in the wireless WAN 130. The received wireless WAN radio frequency signals may comprise GNSS reference related information such as, for example, specific physical location information of corresponding service area. The specific physical location information in the received WAN radio frequency signals may comprise, for example, an International Mobile Subscriber Identity (IMSI), a Mobile Network Code (MNC), a Mobile Country Code (MCC), a Location Area Code (LAC), Cell ID, a Radio Network Controller (RNC) ID, and/or a base station ID. The GNSS reference related information in the received wireless WAN radio frequency signals may be used as GNSS assistance data to assist full GNSS measurement inside the GNSS capable multi-standard single chip 300. The WWAN radio 308 may be operable to convert the received wireless WAN radio frequency signals to wireless WAN baseband signals, which may be suitable for further processing by the multi-standard baseband processor 312. The WWAN radio 308 may be operable to convert wireless WAN baseband signals to wireless WAN radio frequency signals for transmission to a remote wireless WAN device via the base station 130a.

The FM radio 310 may comprise suitable logic circuitry, interfaces and/or code that may be operable to receive FM radio frequency signals from, for example, the FM radio station 160a in the broadcast network 160. The receive FM radio frequency signals may comprise RDS data over FM bands. The received FM radio frequency signals may comprise GNSS reference related information such as specific physical location information, for example, the ID and/or location of the FM radio station 160a. The GNSS reference related information in the received FM radio frequency signals may be used as GNSS assistance data to assist full GNSS measurement inside the GNSS capable multi-standard single chip 300. The FM radio 310 may be operable to convert the received FM radio frequency signals to FM baseband signals, which may be suitable for further processing in the multi-standard baseband processor 312. The FM radio 310 may be operable to convert FM baseband signals to FM radio frequency signals to support FM radio frequency signal transmission. The FM radio 310 may be operable to transmit and receive FM radio frequency signals concurrently to provide multiple applications such as, for example, traffic alerts and turn-by-turn navigation, at the same time.

The multi-standard baseband processor 312 may comprise suitable logic, circuitry, interfaces and/or code that may be operable to concurrently process multi-standard baseband signals communicated with the GNSS radio 302, the WLAN radio 304, the Bluetooth radio 306, the WWAN radio 308, and the FM radio 310. The multi-standard baseband processor 312 may be operable to take or calculate full GNSS measurement using the GNSS baseband signals received from the GNSS radio 302. The multi-standard baseband processor 312 may be operable to utilize the GNSS measurement engine 312a for the full GNSS measurement.

The GNSS measurement engine 312a may comprise suitable logic, circuitry, interfaces and/or code that may be operable to process GNSS baseband signals received from the GNSS radio 302 for full GNSS measurement. The GNSS measurement engine 312a may be operable to generate and/or calculate various GNSS measurement such as pseudorange, carrier phase, and/or Doppler using the GNSS baseband signals from the GNSS radio 302. The GNSS measurement engine 312a may be operable to calculate the full GNSS measurement.

The multi-standard baseband processor 312 may be operable to extract specific physical location related information from baseband signals received from one or more of the integrated multi-standard radios such as the WLAN radio 304, the Bluetooth radio 306, the WWAN radio 308 and the FM radio 310. The extracted specific physical location related information may comprise, for example, IMSI, MNC, MCC, LAC, Cell ID, RNC ID, a base station ID, a FM station ID, Bluetooth device ID, and/or time. The multi-standard baseband processor 312 may be operable to provide the extracted specific physical location into the GNSS measurement engine 312a as GNSS reference related information to assist full GNSS measurement. The full GNSS measurement may be processed by the multi-standard baseband processor 312 or communicated with the host processor 206 for a full GNSS navigation solution depending on where the navigation engine 312b would be.

The navigation engine 312b may comprise suitable logic, circuitry, interfaces and/or code that may be operable to process GNSS measurement to generate a GNSS navigation solution such as a position fix. The navigation engine 312b may be operable to generate a full GNSS navigation solution by using the full GNSS measurement provided by the GNSS measurement engine 312a. The navigation engine 312b may reside internally to the multi-standard baseband processor 312 or externally to the GNSS capable multi-standard single chip 300 depending on implementation. The multi-standard baseband processor 312 may be operable to apply the full GNSS navigation solution for various location-based services such as, for example, roadside assistance and/or a location-based 411 service. The multi-standard baseband processor 312 may enable the FM radio 310 to concurrently receive and transmit FM radio frequency signals to support multiple location-based services such as, for example, traffic alerts and turn-by-turn navigation, at the same time.

The memory 314 may comprise suitable logic, circuitry, interfaces and/or code that may enable storage of information such as executable instructions and data that may be utilized by the multi-standard baseband processor 312. The executable instructions may comprise algorithms such as full GNSS measurement software and navigation software. The full GNSS measurement software may be utilized by the GNSS measurement engine 312a to calculate full GNSS measurement from GNSS radio frequency signals that are received from visible GNSS satellites. The navigation engine 312b may be operable to calculate a full GNSS navigation solution such as a position fix of the multi-standard mobile device 200. The data may comprise full GNSS measurement and/or specific physical location related information such as, for example, IMSI, MNC, MCC, LAC, Cell ID, RNC ID, a base station ID, a FM station ID, Bluetooth device ID, and/or time.

The memory 314 may comprise RAM, ROM, low latency nonvolatile memory such as flash memory and/or other suitable electronic data storage.

In operation, the multi-standard baseband processor 312 may be operable to concurrently process multi-standard baseband signals received from one or more of the integrated multi-standard radios such as, for example, the GNSS radio 302, the WLAN radio 304, the Bluetooth radio 306, the WWAN radio 308, and the FM radio 310. The GNSS baseband signals received from the GNSS radio 302 may be processed using the GNSS measurement engine 402 for full GNSS measurement. Specific physical location related information may be extracted from baseband signals received from, for example, the WLAN radio 304, the Bluetooth radio 306, the WWAN radio 308, and the FM radio 310, respectively. The extracted specific physical location related information may be utilized as GNSS reference information.

The multi-standard baseband processor 312 may be operable to provide the extracted specific physical location related information as GNSS assistance data to the GNSS measurement engine 312a to assist full GNSS measurement. Depending on the location of the navigation engine 312b, the full GNSS measurement may be processed via the navigation engine 312b for a full GNSS navigation solution. In instances where the navigation engine 312b may reside external to the GNSS capable multi-standard single chip 300, for example, the navigation engine 312b may be located in the host processor 206 or on a remote device. The multi-standard baseband processor 312 may be operable to communicate the full GNSS measurement with the remote device using one or more integrated multi-standard radios such as the Bluetooth radio 306 for the full GNSS navigation solution. The full GNSS navigation solution may be utilized to enable a location-based service such as, for example, location-based friends finding on an associated multi-standard mobile device. The multi-standard baseband processor 312 may be operable to support concurrent transmission and reception of FM radio frequency signals over the FM radio 310 for simultaneous multiple location-based services such as, for example, traffic alerts and turn-by-turn navigation.

Figures 4, 5:
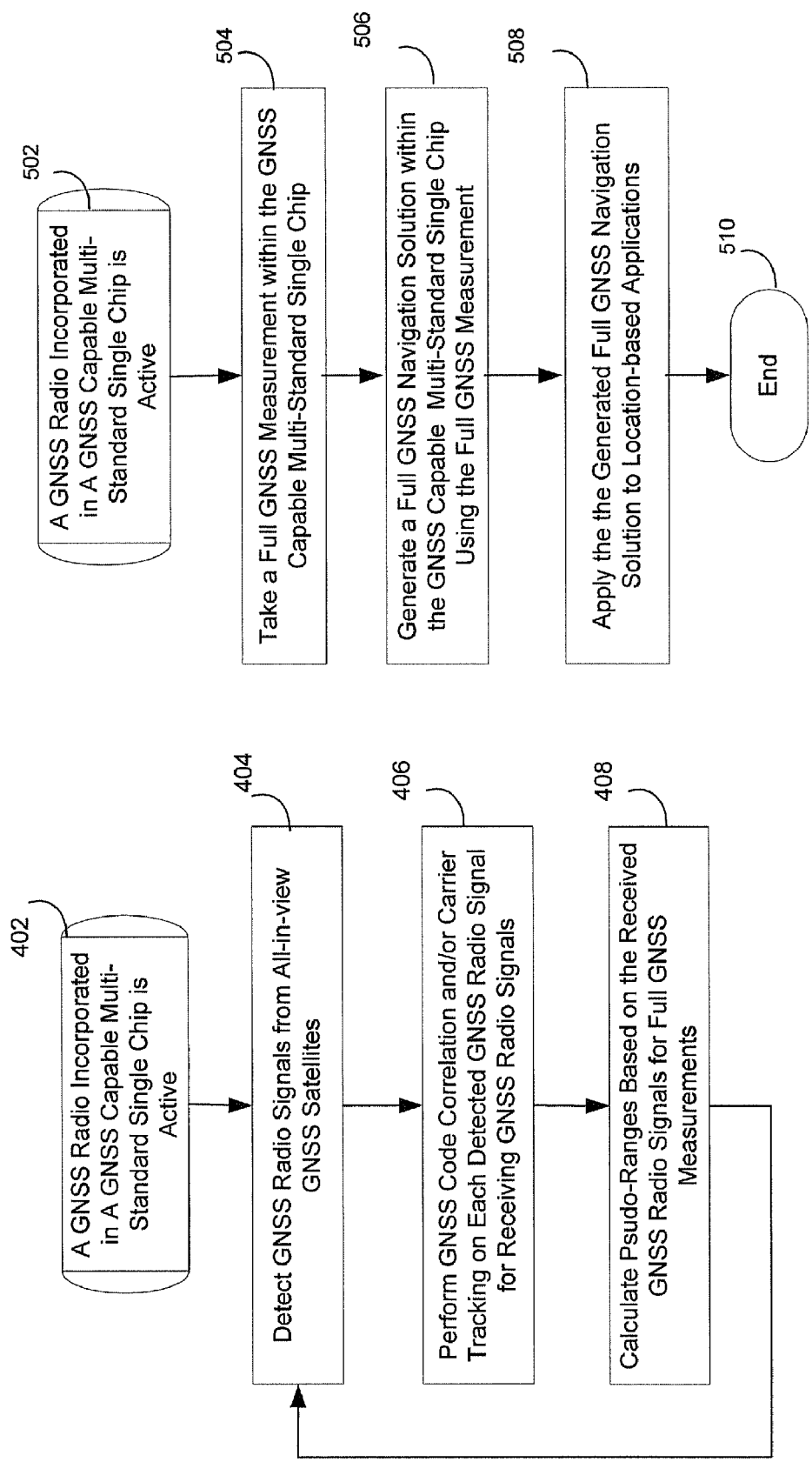
FIG. 4 a flow chart illustrating an exemplary procedure that is utilized within a GNSS capable multi-standard single chip to generate full GNSS measurement, in accordance with an embodiment of the invention.
FIG. 5 a flow chart illustrating an exemplary procedure that is utilized within a GNSS capable multi-standard single chip to internally generate a full GNSS navigation solution, in accordance with an embodiment of the invention.

FIG. 4 a flow chart illustrating an exemplary procedure that is utilized within a GNSS capable multi-standard single chip to generate full GNSS measurement, in accordance with an embodiment of the invention. Referring to FIG. 4, the exemplary steps may start with step 402. In step 402, the GNSS radio 302 integrated within the GNSS capable multi-standard single chip 300 is active and operable to acquire GNSS signals from visible GNSS satellites such as the GNSS satellites 120a-120c. In step 404, the GNSS radio 302 is operable to detect GNSS radio frequency signals from visible GNSS satellites. In step 406, the GNSS radio 302 may be operable to perform GNSS code correlation and/or carrier tracking on each detected GNSS radio frequency signals for receiving GNSS radio frequency signals. In step 408, the GNSS radio 302 may be operable to convert the received GNSS radio frequency signals to GNSS baseband signals and communicate with the multi-standard baseband processor 312. The multi-standard baseband processor 312 may be operable to utilize the GNSS measurement engine 312a to calculate pseudo-range, carrier phase, and/or Doppler for full GNSS measurement using the GNSS baseband signals received from the GNSS radio 302. The exemplary steps may return to step 404.

FIG. 5 a flow chart illustrating an exemplary procedure that is utilized within a GNSS capable multi-standard single chip to internally generate a full GNSS navigation solution, in accordance with an embodiment of the invention. Referring to FIG. 5, the exemplary steps may start with step 502. In step 502, the GNSS radio 302 integrated within the GNSS capable multi-standard single chip 300 is active and operable to acquire GNSS signals from visible GNSS satellites such as the GNSS satellites 120a-120c. In step 504, the GNSS capable multi-standard single chip 300 may be operable to take full GNSS measurement via the GNSS measurement engine 302. In step 506, the GNSS capable multi-standard single chip 300 may be operable to utilize the navigation engine 312b to generate or calculate a full GNSS navigation solution using the full GNSS measurement provided by the GNSS measurement engine 312a. The navigation engine 312b is located inside the GNSS capable multi-standard single chip 300. In step 508, the GNSS capable multi-standard single chip 300 may be operable to apply the generated full GNSS navigation solution to location-based applications such as, for example, location-based 411. The exemplary steps may end in step 510.

FIG. 6 a flow chart illustrating an exemplary procedure that is utilized to externally generate a full GNSS navigation solution on a remote device using full GNSS measurements from a GNSS capable multi-standard single chip, in accordance with an embodiment of the invention. Referring to FIG. 6, the exemplary steps may start with step 602. In step 602, the GNSS radio 302 integrated within the GNSS capable multi-standard single chip 300 is active and operable to acquire GNSS signals from visible GNSS satellites such as the GNSS satellites 120a-120c. In step 604, the GNSS capable multi-standard single chip 300 may be operable to take full GNSS measurement via the GNSS measurement engine 302. In step 606, the GNSS capable multi-standard single chip 300 may be operable to communicate the full GNSS measurement to an external device comprising the navigation engine. In step 608, a full GNSS navigation solution may be generated via the navigation engine 312b on the external device. The navigation engine 312b may be operable to use the full GNSS measurement provided by the GNSS measurement engine 312a for the full GNSS navigation solution. In step 610, the GNSS capable multi-standard single chip 300 may be operable to apply the generated full GNSS navigation solution to location-based services such as, for example, location-based 411. The exemplary steps may end in step 612.

FIG. 7 a flow chart illustrating an exemplary procedure in which a GNSS capable multi-standard single chip is operable to utilize radio frequency signals received via integrated multi-standard radios to assist on-chip full GNSS measurement, in accordance with an embodiment of the invention. Referring to FIG. 7, the exemplary steps may start with step 702. In step 702, the GNSS radio 302 integrated within the GNSS capable multi-standard single chip 300 is active for acquiring GNSS signals from visible GNSS satellites such as the GNSS satellites 120a-120c. In step 704, the GNSS capable multi-standard single chip 300 may be operable to concurrently receive multi-standard radio frequency signals by a plurality of multi-standard radios such as, for example, the WLAN radio 304, the Bluetooth radio 306, the WWAN radio 308, and the FM radio 310, respectively. The resulting GNSS baseband signals from the GNSS radio 302 may be processed via the GNSS measurement engine 312a inside the multi-standard baseband processor 312 for full GNSS measurement.

In step 706, the multi-standard baseband processor 312 may be operable to extract GNSS reference information from the received multi-standard radio frequency signals. The extracted GNSS reference information may comprise, for example, IMSI, MNC, MCC, LAC, Cell ID, RNC ID, a base station ID, a FM station ID, Bluetooth device ID, WLAN access point ID, WLAN access point location, and/or time information. In step 708, the multi-standard baseband processor 312 may be operable to impose the extracted GNSS reference information into the GNSS measurement engine 302 as GNSS assistance data to assist full GNSS measurement within the GNSS capable multi-standard single chip 300. The exemplary steps may end in step 710.

Figure 8:
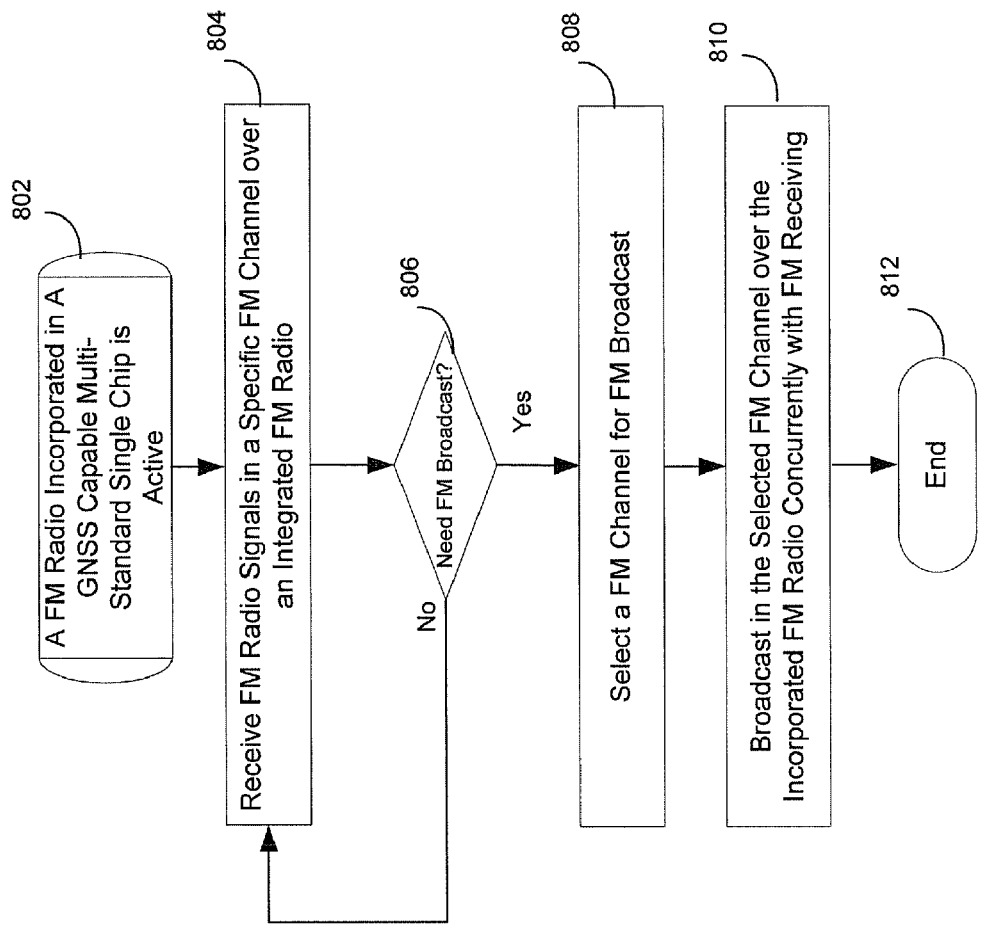
FIG. 8 a flow chart illustrating an exemplary procedure in which a GNSS capable multi-standard single chip concurrently transmits and receives FM radio frequency signals by an integrated FM radio, in accordance with an embodiment of the invention.

FIG. 8 a flow chart illustrating an exemplary procedure in which a GNSS capable multi-standard single chip concurrently transmits and receives FM radio frequency signals by an integrated FM radio, in accordance with an embodiment of the invention. Referring to FIG. 8, the exemplary steps may start with step 802. In step 802, the FM radio 310 integrated within the GNSS capable multi-standard single chip 300 is active for receiving FM radio frequency signals from, for example, the FM radio station 160a. In step 804, the GNSS capable multi-standard single chip 300 may be operable to receive FM radio frequency signals in a specific channel over the FM radio 310. In step 806, it may be determined whether a FM broadcast from the GNSS capable multi-standard single chip 300 may be needed. In instances where a FM broadcast from the GNSS capable multi-standard single chip 300 may be needed, then in step 808, the FM radio 310 may be operable to select a FM channel to be used for the FM broadcast. The selected channel may be different from the specific channel used to receive FM radio frequency signals from the FM radio station 160a. In step 810, the GNSS capable multi-standard single chip 300 may be operable to perform the FM broadcast in the selected channel over the FM radio 310 concurrently while receiving FM radio frequency signals in the specific channel from the FM radio station 160a. The exemplary steps may end in step 812.

In various exemplary aspects of the method and system for a full GNSS capable multi-standard single chip, a GNSS capable single chip such as the GNSS capable multi-standard single chip 300 integrated inside, for example, the multi-standard mobile device 110a, may be operable to concurrently receive multi-standard radio frequency signals by corresponding two or more radios integrated within the GNSS capable multi-standard single chip 300. The GNSS capable multi-standard single chip 300 may be operable to take or generate full GNSS measurement via the GNSS measurement engine 312a. The full GNSS measurement may comprise pseudo-range information. The GNSS measurement engine 312a may be incorporate each of necessary correlators to detect and/or track GNSS radio frequency signals from visible GNSS satellites such as the GNSS satellites 120a-120c. The GNSS capable multi-standard single chip 300 may be integrated with the GNSS radio 302 and one or more non-GNSS radios such as, for example, the WLAN radio 304, the Bluetooth radio 306, the WWAN radio 308, and/or the FM radio 310. The WWAN radio 308 may comprise a WiMAX radio and by one or more cellular radios such as, for example, GSM radio, GPRS radio, UMTS radio, EDGE radio, EGPRS radio, and/or LTE radio.

The GNSS capable multi-standard single chip 300 may be operable to generating the full GNSS measurement for GNSS radio frequency signals received by the GNSS radio 302. GNSS satellite reference information such as time and/or location related information embedded inside the radio frequency signals received by, for example, the WLAN radio 304, the Bluetooth radio 306, the WWAN radio 308, and/or the FM radio 310 may be extracted via the multi-standard baseband processor 312. The extracted GNSS satellite reference information may be imposed into the GNSS measurement engine 312a to assist full GNSS measurement. The extracted GNSS satellite may comprise, for example, an International Mobile Subscriber Identity (IMSI), a Mobile Network Code (MNC), a Mobile Country Code (MCC), a Location Area Code (LAC), Cell ID, a Radio Network Controller (RNC) ID, a base station ID, a broadcast tower ID, and/or time information. As described with respect to FIG. 1, FIG. 5, and FIG. 6, depending on a location of the navigation engine, for example, the navigation engine 312b, a full GNSS navigation solution for the multi-standard mobile device 110a, for example, may be generated inside the GNSS capable multi-standard single chip 300 or on a remote device.

In instances where the navigation engine 312b may be located on a remote device, for example, the Bluetooth enabled device 150a, the multi-standard mobile device 110a may be operable to communicate the full GNSS measurement generated within the integrated GNSS capable multi-standard single chip 300 to the Bluetooth enabled device 150a using a corresponding integrated radio such as the Bluetooth radio 306. The full GNSS navigation solution of the multi-standard mobile device 110a may be generated over the Bluetooth enabled device 150a. The Bluetooth enabled mobile device 150a may be operable to communicate the generated full GNSS navigation solution with the multi-standard mobile device 110a for various location-based services such as, location-based friends finding. The GNSS capable multi-standard single chip 300 may be operable to generate the full GNSS measurement independent of and without intervention by a host processor within the multi-standard mobile device 110a.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for a full GNSS capable multi-standard single chip.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
performing by one or more processors and/or circuits in a Global Navigation Satellite System (GNSS) single chip, wherein said GNSS single chip is integrated within a mobile device:
concurrently receiving a plurality of multi-standard radio frequency signals by two or more radios integrated within said GNSS capable single chip; and
generating a full GNSS measurement comprising pseudo-range information from said received plurality of multi-standard radio frequency signals.

2. The method according to claim 1, wherein said two or more integrated radios comprise a GNSS radio and one or more non-GNSS radios comprising at least one of cellular radios, a Worldwide Interoperability for Microwave Access (WiMAX) radio, a Bluetooth radio, a wireless local area network (WLAN) radio, and a FM radio.

3. The method according to claim 2, wherein said one or more cellular radios comprise at least one of a Global System for Mobile communications (GSM) radio, a General Packet Radio Services (GPRS) radio, a Universal Mobile Telecommunications System (UMTS) radio, an Enhanced Data rates for GSM Evolution (EDGE) radio, an Enhanced GPRS (EGPRS) radio, and a 3GPP Long Term Evolution (LTE) radio.

4. The method according to claim 2, comprising generating said full GNSS measurement using radio frequency signals received by said GNSS radio.

5. The method according to claim 2, comprising extracting satellite reference information from radio frequency signals received by said at least one of cellular radios, said WiMAX radio, said Bluetooth radio, said WLAN radio, and said FM radio.

6. The method according to claim 5, comprising generating said full GNSS measurement based on said extracted satellite reference information.

7. The method according to claim 5, wherein said extracted satellite reference information comprise at least one of an International Mobile Subscriber Identity (IMSI), a Mobile Network Code (MNC), a Mobile Country Code (MCC), a Location Area Code (LAC), Cell ID, a Radio Network Controller (RNC) ID, a base station ID, a broadcast tower ID, and time information.

8. The method according to claim 2, comprising generating a full GNSS navigation solution for said mobile device inside said GNSS capable single chip using said generated full GNSS measurement.

9. The method according to claim 2, comprising communicating said generated full GNSS measurement to at least one of a remote and local device using one or more integrated radios, wherein said at least one of remote and local device generates a full GNSS navigation solution for said mobile device using said transmitted full GNSS measurement.

10. The method according to claim 2, comprising generating said full GNSS measurement by said (GNSS) capable single chip independent of a host processor within said mobile device.

11. A system for communication, the system comprising:
one or more processors and/or circuits in a Global Navigation Satellite System (GNSS) capable single chip that is integrated in a mobile device, wherein said one or more processors and/or circuits are operable to:
concurrently receive a plurality of multi-standard radio frequency signals by two or more radios integrated within said GNSS capable single chip; and
generate, within said GNSS capable single chip, full GNSS measurement comprising pseudo-range information from said received plurality of multi-standard radio frequency signals.

12. The system according to claim 11, wherein said two or more integrated radios comprise a GNSS radio and one or more non-GNSS radios comprising at least one of cellular radios, a Worldwide interoperability for Microwave Access (WiMAX) radio, a Bluetooth radio, a wireless local area network (WLAN) radio, and a FM radio.

13. The system according to claim 12, wherein said one or more cellular radios comprise at least one of a Global System for Mobile communications (GSM) radio, a General Packet Radio Services (GPRS) radio, a Universal Mobile Telecommunications System (UMTS) radio, an Enhanced Data rates for GSM Evolution (EDGE) radio, an Enhanced GPRS (EGPRS) radio, and a 3GPP Long Term Evolution (LTE) radio.

14. The system according to claim 12, wherein said one or more processors and/or circuits are operable to generate said full GNSS measurement using radio frequency signals received by said GNSS radio.

15. The system according to claim 12, wherein said one or more processors and/or circuits are operable to extract satellite reference information from radio frequency signals received by said at least one of cellular radios, said WiMAX radio, said Bluetooth radio, said WLAN radio, and said FM radio.

16. The system according to claim 15, wherein said one or more processors and/or circuits are operable to generate said full GNSS measurement based on said extracted satellite reference information.

17. The system according to claim 15, wherein said extracted satellite reference information comprise at least one of International Mobile Subscriber Identity (IMSI), a Mobile Network Code (MNC), a Mobile Country Code (MCC), a Location Area Code (LAC), Cell ID, a Radio Network Controller (RNC) ID, a base station ID, a broadcast tower ID, and time information.

18. The system according to claim 12, wherein said one or more processors and/or circuits are operable to generate a full GNSS navigation solution for said mobile device inside said GNSS capable single chip using said generated full GNSS measurement.

19. The system according to claim 12, wherein said one or more processors and/or circuits are operable to communicate said generated full GNSS measurement to at least one of a remote and local device using one or more integrated radios, wherein said at least one of remote and local device generates a full GNSS navigation solution of said mobile device using said transmitted full GNSS measurement.

20. The system according to claim 12, wherein said one or more processors and/or circuits are operable to generate said full GNSS measurement independent of a host processor within said mobile device.

* * * * *